US012240077B2

(12) United States Patent
Ching

(10) Patent No.: US 12,240,077 B2
(45) Date of Patent: Mar. 4, 2025

(54) GUARD FOR A ROTATABLE WHEEL OF A POWER TOOL

(71) Applicant: SWISSLOGO AG, Zurich (CH)

(72) Inventor: Michael Ching, Zurich (CH)

(73) Assignee: SWISSLOGO AG, Zurich (CH)

( * ) Notice: Subject to any disclaimer, the term of this patent is extended or adjusted under 35 U.S.C. 154(b) by 0 days.

(21) Appl. No.: 18/549,222

(22) PCT Filed: Mar. 10, 2022

(86) PCT No.: PCT/EP2022/056192
§ 371 (c)(1),
(2) Date: Sep. 6, 2023

(87) PCT Pub. No.: WO2022/189569
PCT Pub. Date: Sep. 15, 2022

(65) Prior Publication Data

US 2024/0123571 A1 Apr. 18, 2024

(30) Foreign Application Priority Data

Mar. 10, 2021 (GB) ..................................... 2103281

(51) Int. Cl.
*B24B 55/05* (2006.01)
*B24B 55/10* (2006.01)
*B25F 5/02* (2006.01)

(52) U.S. Cl.
CPC .......... *B24B 55/052* (2013.01); *B24B 55/102* (2013.01); *B25F 5/02* (2013.01)

(58) Field of Classification Search
CPC ........ B24B 55/052; B24B 55/102; B25F 5/02
See application file for complete search history.

(56) References Cited

U.S. PATENT DOCUMENTS

| | | | | |
|---|---|---|---|---|
| 1,888,679 | A | 11/1932 | Knapp | |
| 2009/0181604 | A1 | 7/2009 | Loveless et al. | |
| 2011/0021121 | A1 * | 1/2011 | Loveless ............... | B24B 23/028 451/456 |
| 2013/0137348 | A1 | 5/2013 | Chen | |

FOREIGN PATENT DOCUMENTS

| | | | |
|---|---|---|---|
| CN | 107363686 | B | 6/2020 |
| DE | 1121968 | B | 1/1962 |
| DE | 3533668 | A1 | 3/1987 |
| DE | 3620562 | A1 | 12/1987 |
| DE | 4426717 | A1 | 1/1996 |
| EP | 2186600 | A1 | 5/2010 |
| NL | 2002807 | C | 10/2010 |

* cited by examiner

*Primary Examiner* — Nathaniel C Chukwurah
(74) *Attorney, Agent, or Firm* — Harter Secrest & Emery LLP; Michael Nicholas Vranjes

(57) ABSTRACT

A guard for a rotatable wheel of a power tool is disclosed. The guard comprises a shroud which is configured to partially enclose the wheel and a port disposed at a circumferential position on the shroud, via which debris generated by the wheel during use can exit the shroud. The shroud comprises a radii of curvature which increases between a first angular position and a second angular position, relative to a rotational axis of the wheel, in a direction comprising a rotational direction of the wheel.

19 Claims, 7 Drawing Sheets

GUARD FOR A ROTATABLE WHEEL OF A POWER TOOL

CROSS-REFERENCE TO RELATED APPLICATIONS

The present application is a U.S. National Stage Application pursuant to 35 U.S.C. § 371 of International Patent Application No. PCT/EP2022/056192, filed on Mar. 10, 2022, which application claims priority to United Kingdom Patent Application No. 2103281.8, filed on Mar. 10, 2021, which applications are incorporated herein by reference in their entireties.

FIELD

The present invention relates to a guard for a rotatable wheel of a power tool, and particularly but not exclusively, to a guard for a grinding wheel or disk of a grinder.

BACKGROUND

Grinders and disk cutters are frequently used to grind grooves into workpieces, remove excess material such as burrs, and also to polish workpieces. In order to protect the user of the grinding tool, the tools are usually provided with a protective cover or guard that partially surrounds the grinding wheel on one rotational side thereof.

A disadvantage of such grinding tools is that during use, a relatively large amount of dust and debris can be released into the workspace leading to a polluted and unsafe work environment. To this end, protective covers, such as the cover disclosed in NL2002807C, can be used with extraction systems for extracting the debris generated by the grinding process. These covers typically comprise an integrated extraction port for connection to an extraction hose. However, the protective covers do not provide for a sufficient extraction and as such, a significant amount of debris and pollutants are still found to escape to the work environment.

SUMMARY

An object of the present invention is to provide a guard which can at least partly alleviate the above-mentioned disadvantage.

According to a first aspect of the present invention there is provided a guard for a rotatable wheel of a power tool, the guard comprising: a shroud which is configured to partially enclose the wheel; a port disposed at a circumferential position on the shroud, via which debris generated by the wheel during use can exit the shroud; wherein the shroud comprises a radii of curvature which increases around the shroud between a first angular position and a second angular position, relative to a rotational axis of the wheel, in a direction comprising a rotational direction of the wheel.

Advantageously, the shroud design provides for an improved air flow around the wheel within the shroud, to facilitate an improved extraction of debris and pollutants generated by the rotating wheel.

In an embodiment, the port is orientated along a direction which comprises a rotational center of the wheel. It is envisaged that the port may comprise and/or be configured to detachable couple with a duct, for directing the flow of debris from the shroud.

In an embodiment, the radii of curvature progressively increases between the first and second angular position. However, in an alternative embodiment, it is envisaged that the radii of curvature may be substantially constant through a first angular range and progressively increase through a second angular range toward the second angular position.

In an embodiment, the first and second angular positions are disposed at either side of the port, such that the radii of curvature comprises a discontinuous change at the port. The increased radii of curvature causes the rotational speed of the air flow proximate the second angular position, and thus any debris entrained therein, to be lower than at the first angular position. This slower airflow enables more of the airflow and debris to exit via the port. Moreover, the debris in the airflow become forced radially outwardly within the shroud due to the centrifugal force, and as such as the debris moves around the shroud it travels close to the interior surface of the shroud. When the debris encounters the second angular position, it strikes the portion of the shroud at the region of the discontinuous change in radii of the shroud, which effectively causes the debris to collect near the port where it can subsequently be extracted.

In an embodiment, the shroud comprises a first shroud portion and a second shroud portion, which, in use of the tool, may comprise an upper shroud portion and a lower shroud portion, respectively. The first and second shroud portions may be detachably couplable together along a periphery thereof.

In an embodiment, the guard further comprises a window formed in the shroud, via which the wheel can extend out from the shroud, the window being disposed substantially diametrically opposite the port. Preferably, the window extends between the upper and lower portion of the shroud, and is inclined relative to the lower portion of the shroud, in a direction which is away from the port.

In an embodiment, the window is inclined at an angle of substantially 20° relative to the lower portion of the shroud.

In an embodiment, the guard further comprises one or more apertures formed on the shroud, through which air may pass into the shroud during use of the tool. The guard may comprise three apertures angularly separated around the shroud, which may be disposed on an upper portion of the shroud.

In an embodiment, the apertures are located rotationally closer to the first angular position than the second angular position and an angular separation between the apertures and the port is less than 1800. Preferably, the angular separation is in the range of 90°-180°.

In an embodiment, the guard further comprises a bracket disposed upon the shroud for detachably coupling the guard to a power tool.

According to a second aspect of the present invention, there is provided a power tool comprising a guard according to the first aspect.

According to a third aspect of the present invention, there is provided an extracting assembly for extracting debris and pollutants generated by a rotating wheel of a power tool, the assembly comprising a guard according to the first aspect and a vacuum generating arrangement fluidly couplable with the port for extracting debris and pollutants from within the guard.

BRIEF DESCRIPTION OF THE DRAWINGS

The invention may be performed in various ways and embodiments thereof will now be described, by way of example only, reference being made to the accompanying drawings, in which.

DETAILED DESCRIPTION

Figure 1:
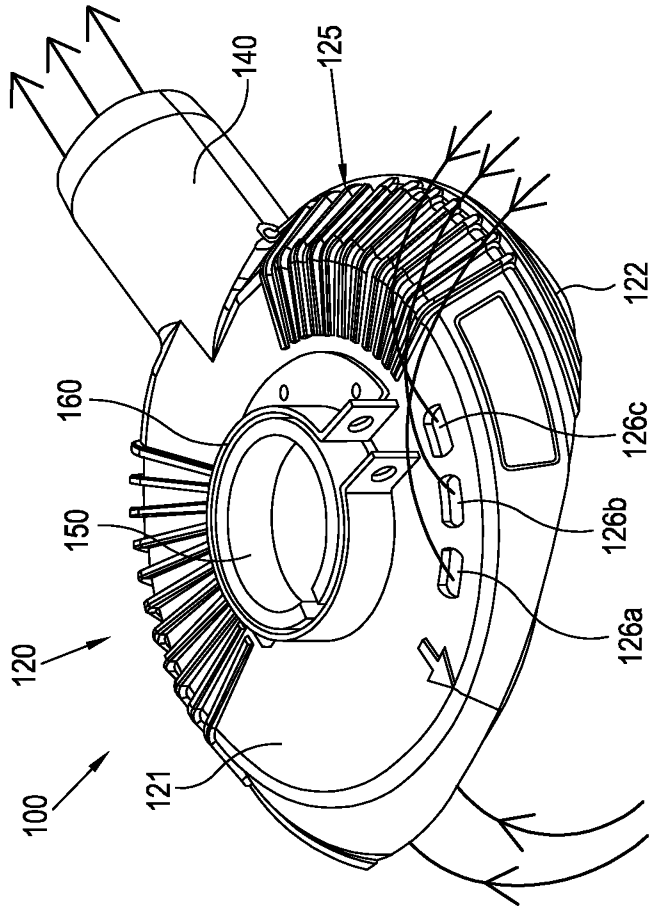
FIG. 1 is a perspective view of a guard according to embodiment of the present invention, from the front.

Referring to FIG. 1 of the drawings, there is illustrated a guard 100 according to an embodiment of the present invention for a rotatable wheel W of a power tool T. The guard 100 is configured to detachably couple with the power tool T and is arranged to protect a user from accidental contact with the rotating wheel W and also from debris which is generated when the wheel W, such as a grinding wheel, contacts a surface.

Figure 2:
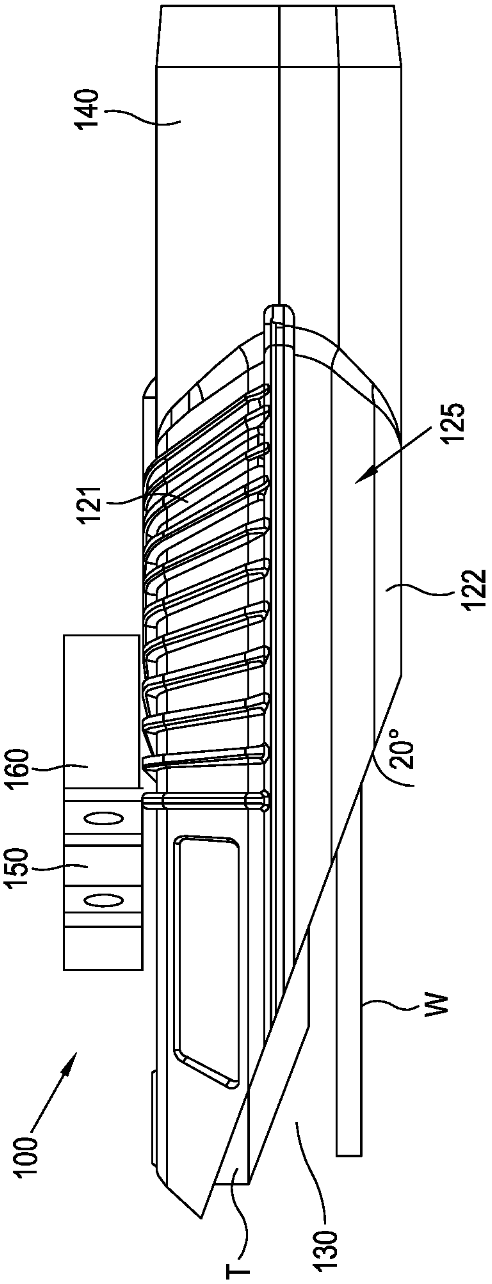
FIG. 2 is a side view of the guard illustrated in FIG. 1.
Figure 3B:
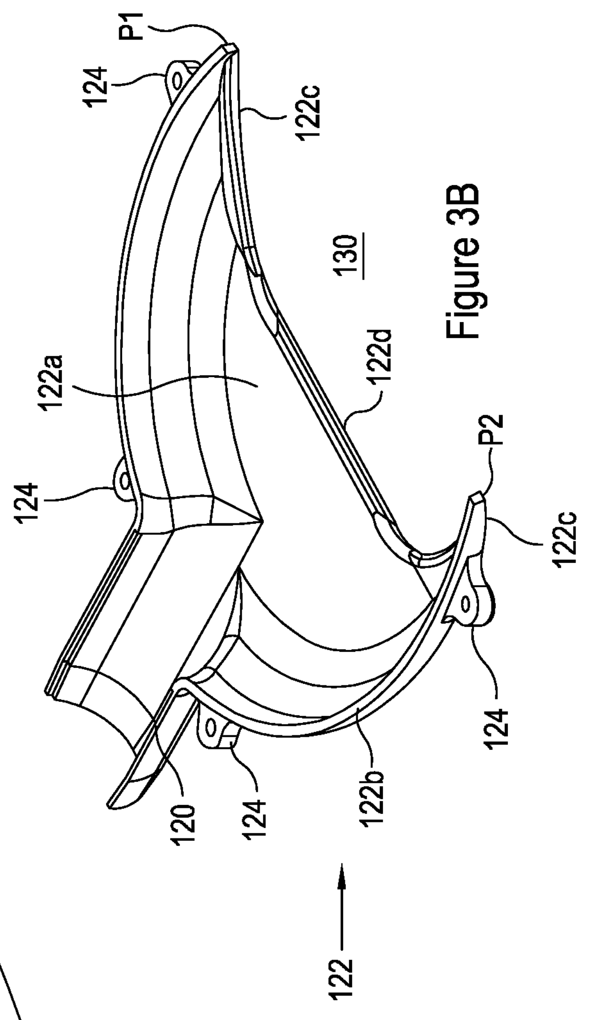
FIGS. 3*a* and 3*b* are perspective views of a first and second portion of the shroud, from the front.
Figure 3A:
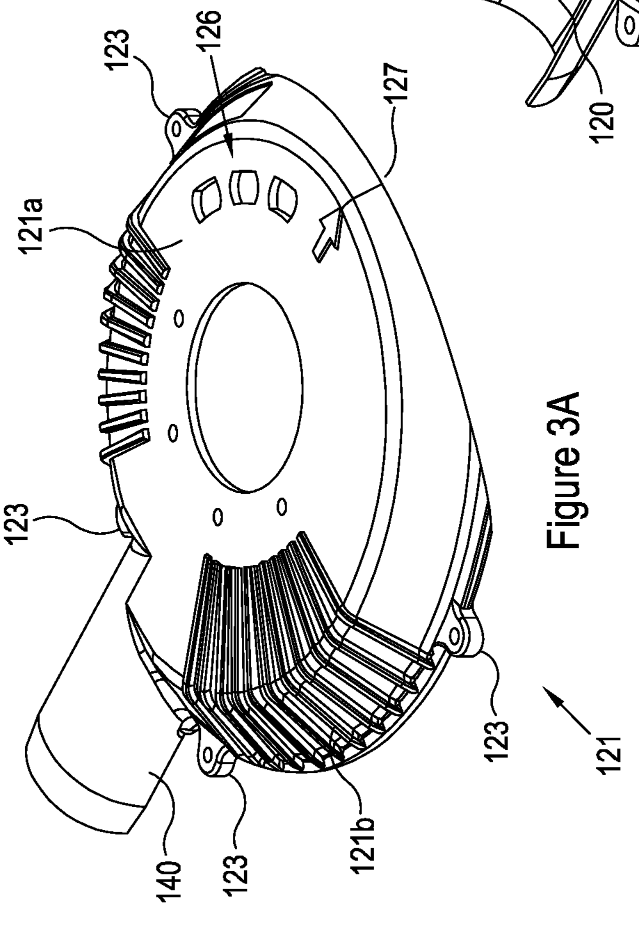

The guard 100 may be formed of a metal or a rigid plastics material and comprises a shroud 120 which arranged to partially enclose the wheel W. Referring to FIGS. 2 and 3 of the drawings, the shroud 120 comprises a first and second shroud portion 121, 122, which in use comprises an upper and lower shroud portion which are arranged to detachably couple together along a circumferential position thereof to define a cavity within which the wheel W is arranged to rotate. The upper shroud portion 121 comprises upper wall 121*a* having a disk shape and a first wall 121*b* which extends downwardly away from the upper wall 121 along a periphery thereof. The lower shroud portion 122 comprises a lower wall 122*a* having a shape which is substantially a minor segment of a circle, and a second wall 122*b* which extends upwardly away from the lower wall 122*a* along a periphery of the arcuate region thereof. The upper and lower shroud portions 121, 122 are detachably coupled together by positioning the first wall 121*b* upon the second wall 122*b* and passing fasteners (not shown) through eyelets 123 on the first wall 121*b* which are aligned with eyelets 124 on the second wall 122*b*.

The first and second wall 121*b*, 122*b* of the upper and lower shroud portions 121, 122 cooperatively form the side wall 125 of the shroud 120. However, owing to the disk shape and minor segment shape of the upper and lower walls 121*a*, 122*a* respectively, the first and second side walls 121*b*, 122*b* are arranged to abut through a limited angular range around the shroud 120. In an embodiment, this angular range comprises approximately 200°.

The first side wall 121*b* extends at a constant depth from the upper wall 121*a* throughout this angular range, however, the second side wall 122*b* extends at a constant height above the lower wall 122*a* through an angular range which is less than 200°. In this respect, the second side wall extends beyond the arcuate periphery of the minor segment to form an overhang 122*c* which extends rotationally beyond the chord 122*d* of the segment. Furthermore, the depth of the first side wall 121*b* around the upper wall reduces from a point of abutment at one rotational side of the second side wall 122*b*, to a minimum depth 127, and then increases again to the point of abutment with the other rotational side of the second side wall 122*b*.

The varying depth of the first side wall 121*b*, and the overhang portion 122*c* of the second side wall 122*b* cooperatively define a window 130 within the shroud 120 through which the wheel W can extend to contact a workpiece (not shown). The window 130 is inclined relative to the lower wall 122*a* through an angle of approximately 20°-30° with this inclination being typical of the preferred angular orientation of a grinding wheel W relative to a surface of a workpiece.

The guard 100 further comprises a port 140 formed therein via which debris and pollutants which become entrained with an airflow created by the rotating wheel W, can exit the shroud 120. The port 140 is disposed in the side wall 125 of the shroud 120 and comprises a circular cross-sectional opening 141, 142, half of which is formed in the upper shroud portion 121 and half of which is formed in the lower shroud portion 122. The port 140 extends substantially transverse to a radius of the shroud and is directed along a direction which comprises a rotational center of the rotatable wheel W. In an embodiment, the port 140 may further comprise a cylindrical duct 143 formed integrally with the shroud 120 for permitting a fluid coupling of the shroud with a fluid exhaust system (not shown).

Figure 4B:
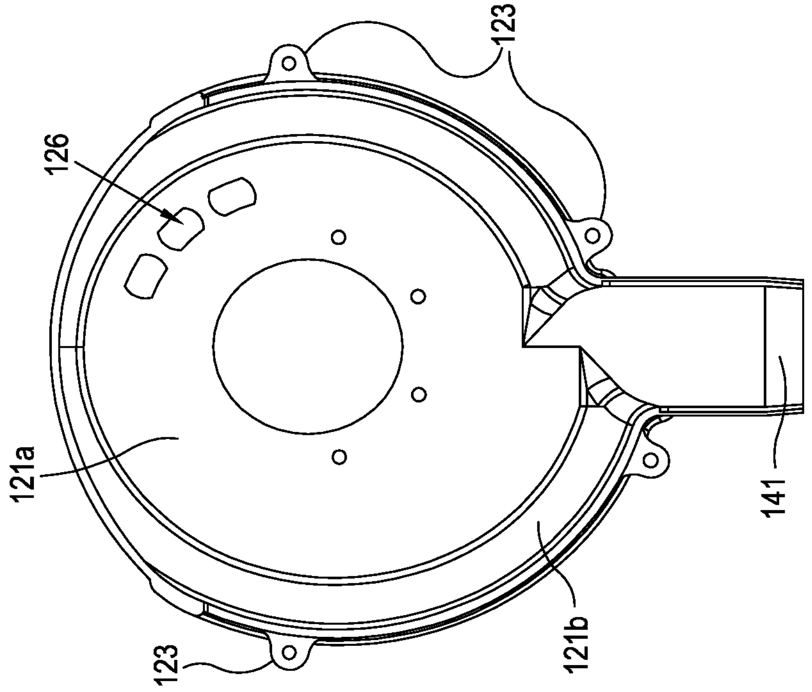
FIGS. 4*a* and 4*b* are perspective views of the underside, namely interior, of the first portion of the shroud.
Figure 4A:
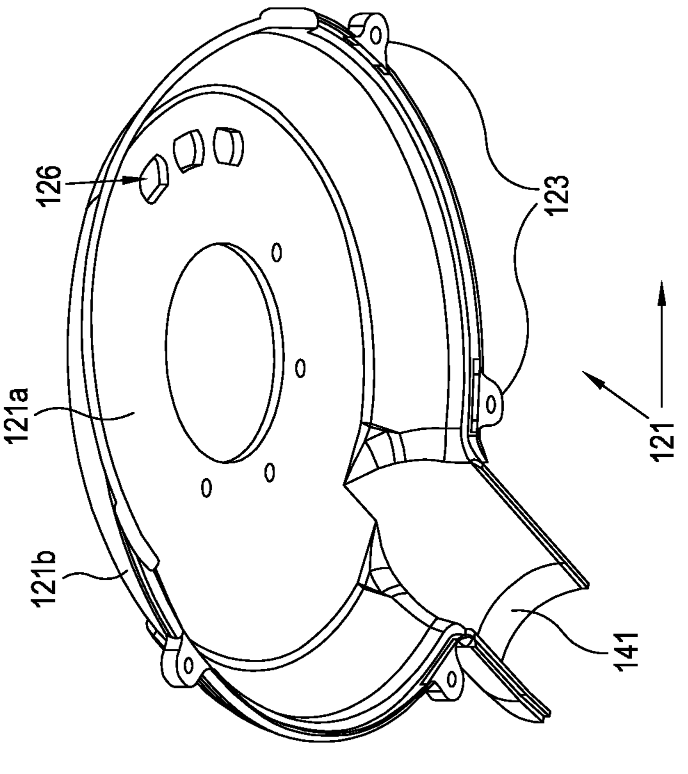
Figure 5:
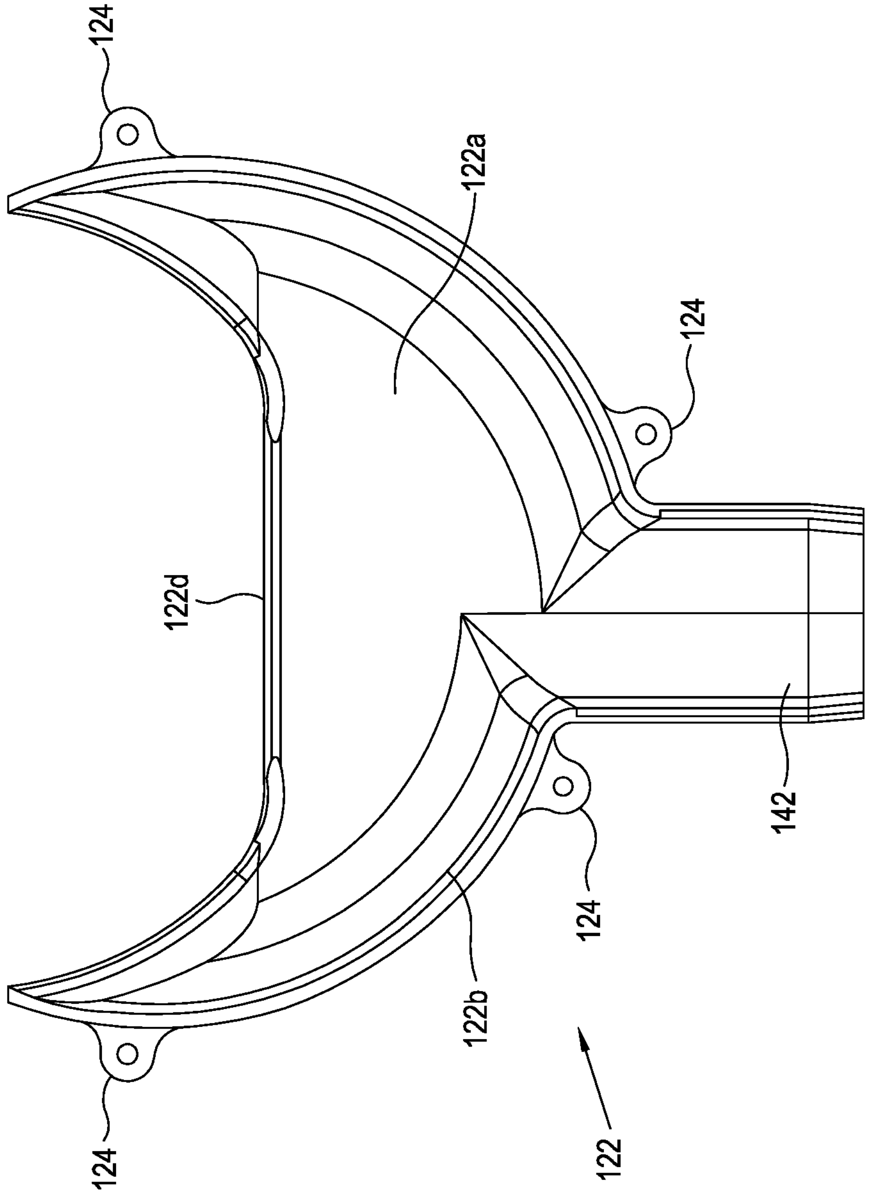
FIG. 5 is a perspective view of the interior of the second portion of the shroud.

Referring to FIGS. 4 and 5 of the drawings, the shroud 120 comprises a radii of curvature which increases relative to a rotational axis of the wheel W, from a first angular position P1 disposed at one rotational side of the port 140, to a second angular position P2 disposed at the opposing rotational side of the port 140. In the illustrated embodiment, the radii of curvature is substantially constant through a first angular range of substantially 180°, but then progressively increases toward the second angular position P2. However, in an alternative embodiment, the radii of curvature may progressively increase from the first angular position P1 to the second angular position P2. The radii of curvature is arranged to increase in a direction which comprises a rotational direction of the wheel W, such that as the wheel rotates, the air flow within the shroud 120 moves around the shroud 120 from the first angular position P1 toward the second angular position P2. The increase in radii of curvature around the shroud 120 results in a discontinuous change in radii either side of the port 140 and as such, the radially inward portion of the shroud 120 at one side of the port 140 relative to the opposing side creates a barrier to air flow.

The shroud 120 further comprises a plurality of apertures 126 formed on the upper wall 121*a* for permitting air to pass into the shroud 120 during the rotation of the wheel W. In the illustrated embodiment, the shroud 120 comprises three apertures 126*a-c* and these are rotationally separated from each other. However, the apertures 126*a-c* are located rotationally closer to the first angular position P1 than the second angular position P2 and in an embodiment, the apertures 126*a-c* are angularly separated from the first angular position P1 by substantially 90°-180°.

Figure 6B:
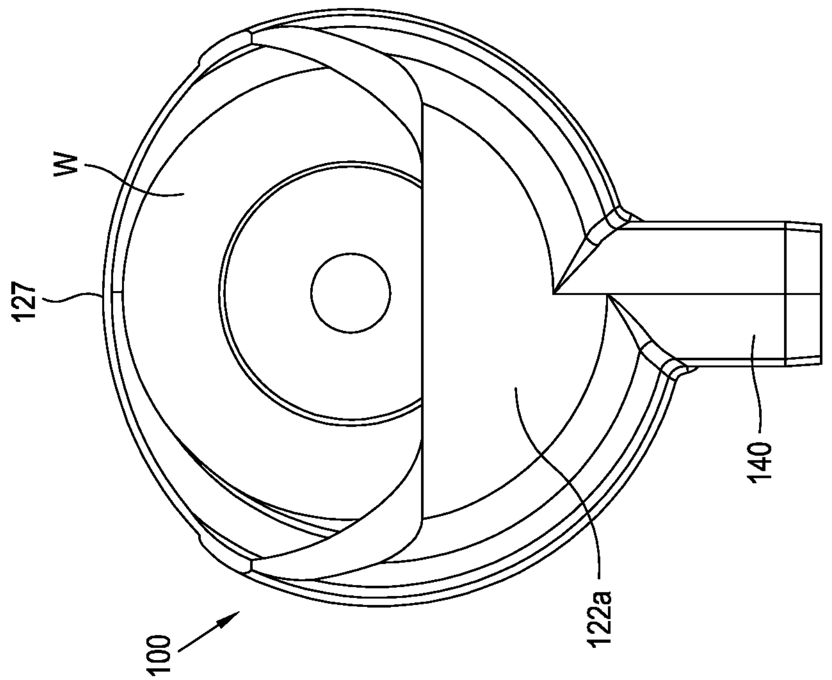
FIGS. 6*a* and 6*b* are perspective views from above and below of a guard according to an embodiment of the invention.
Figure 6A:
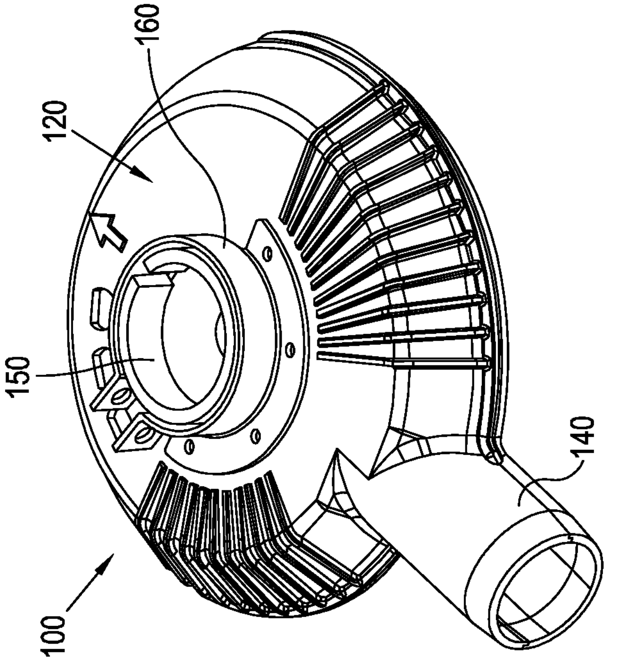

Referring to FIG. 6 of the drawings, the guard 100 further comprises a collar 150 formed on the upper wall 121*a* of the shroud 120 and which is centered around a rotational axis of the wheel W. The collar 150 is arranged to locate around a hub (not shown) of the power tool T, and a bracket 160 is detachably coupled around the collar 150 for tightening the collar 150 upon the hub, and thus securing the guard 100 to the power tool T. During use, with the guard 100 secured to the power tool T, such as a grinder, the wheel W, such as a grinding wheel or disk is arranged to rotate within the shroud 120. The wheel W is further arranged to extend out from the shroud 120 through the window 130 so that the wheel W can contact a work piece (not shown).

Figure 7:
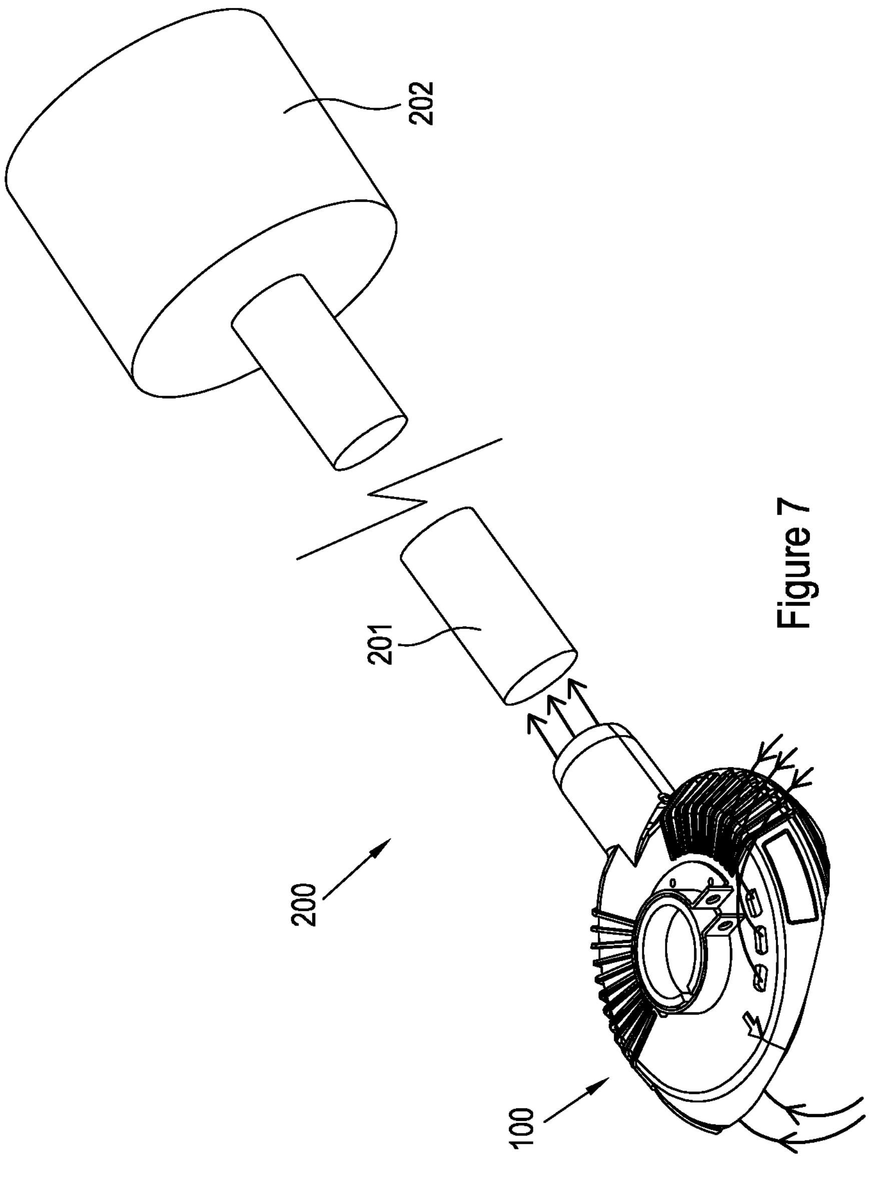
FIG. 7 is a schematic illustration of an extracting assembly according to an embodiment of the present invention.

As the wheel W rotates, air is drawn into the shroud 120 via the window 130 and also via the apertures 126*a-c* formed on the upper wall 121*a* of the shroud 120. This is because as the wheel rotates the air pressure within the shroud 120 reduces compared with the air pressure outside of the shroud 120 owing to the rotational flow of air around the shroud 120. Any debris and/or pollutants generated by the contact of the rotating wheel W with the workpiece (not shown) will become entrained with the airflow within the shroud 120. However, as the air and debris moves around the shroud 120, the debris will become forced radially outwardly within the shroud 120 due to the centrifugal force exerted thereupon. When the debris encounters the second angular position P2, it strikes the barrier within the shroud created by the discontinuous change in radii of the shroud 120, which effectively causes the debris to collect near the port 140. Moreover, as the air flow moves toward second angular position P2, the air flow speed will reduce owing to the increased space within the shroud 120 proximate the second angular position P2 compared with the first angular position P1. This reduced airflow speed coupled with the deposition of debris proximate the port 140 is found to facilitate the removal of debris from the shroud 120 via the port 140. To further encourage this removal, an exhaust system may be fluidly coupled to port 140 to actively extract the debris and any pollutants entrained within the air flow. Referring to FIG. 7 of the drawings, there is illustrated an extracting assembly 200 for extracting debris and pollutants within the shroud 120. The assembly comprises a conduit 201 which is arranged to fluidly couple the port 140 with a vacuum generating source, such as an impeller 202 for creating an air flow out from the shroud to extract the debris and pollutants.

It will be appreciated that the invention may be varied according to requirements, including but not limited to physical dimensions or construction materials, having as its objective the provision of a guard for a rotatable wheel of a power tool which improves the efficiency of extraction of particulate matter during grinding.

The invention claimed is:

1. A guard for a rotatable wheel of a power tool, the guard comprising:
- a shroud which is configured to partially enclose the wheel;
- a port disposed at a circumferential position on the shroud, via which debris generated by the wheel during use can exit the shroud;
- wherein the shroud comprises a radii of curvature which increases between a first angular position and a second angular position, relative to a rotational axis of the wheel, in a direction comprising a rotational direction of the wheel.

2. The guard according to claim 1, wherein the port is orientated along a direction which comprises a rotational center of the wheel.

3. The guard according to claim 1, wherein the radii of curvature progressively increases between the first and second angular position.

4. The guard according to claim 1, wherein the radii of curvature is substantially constant through a first angular range and progressively increases through a second angular range toward the second angular position.

5. The guard according to claim 1, wherein the first and second angular positions are disposed at either side of the port, such that the radii of curvature comprises a discontinuous change at the port.

6. The guard according to claim 1, wherein the shroud comprises a first shroud portion and a second shroud portion.

7. The guard according to claim 6, wherein the first and second shroud portions comprise, in use of the tool, an upper shroud portion and a lower shroud portion, respectively.

8. The guard according to claim 6, wherein the first shroud portion and second shroud portion are detachably couplable together along a circumferential position thereof.

9. The guard according to claim 1, further comprising a window formed therein, via which the wheel can extend out from the shroud, being disposed substantially diametrically opposite the port.

10. The guard according to claim 9, wherein the first and second shroud portions comprise, in use of the tool, an upper shroud portion and a lower shroud portion, respectively, wherein the window extends between the upper and lower portion of the shroud.

11. The guard according to claim 10, wherein the window is inclined relative to the lower portion of the shroud, in a direction which is away from the port.

12. The guard according to claim 11, wherein the window is inclined at an angle of substantially 20°.

13. The guard according to claim 1, further comprising one or more apertures formed on the shroud, through which air may pass into the shroud during use of the tool.

14. The guard according to claim 13, comprising three apertures angularly separated around the shroud.

15. The guard according to claim 13, wherein the one or more apertures are disposed rotationally closer to the first angular position than the second angular position, and an angular separation between the apertures and the port is less than 180°.

16. The guard according to claim 15, wherein the angular separation is in the range of 90°-180°.

17. The guard according to claim 1, further comprising a bracket disposed upon the shroud for detachably coupling the guard to connecting a power tool.

18. A power tool comprising a guard according to claim 1.

19. An extracting assembly for extracting debris and pollutants generated by a rotating wheel of a power tool, the assembly comprising a guard according to claim 1 and a vacuum generating arrangement fluidly couplable with the port for extracting debris and pollutants from within the guard.

* * * * *